US012458883B2

(12) United States Patent
Ishii

(10) Patent No.: US 12,458,883 B2
(45) Date of Patent: Nov. 4, 2025

(54) GAME PROCESSING METHOD AND RECORDING MEDIUM

(71) Applicant: Koei Tecmo Games Co., Ltd., Yokohama (JP)

(72) Inventor: Hiroyuki Ishii, Yokohama (JP)

(73) Assignee: KOEI TECMO GAMES CO., LTD., Yokohama (JP)

( * ) Notice: Subject to any disclaimer, the term of this patent is extended or adjusted under 35 U.S.C. 154(b) by 296 days.

(21) Appl. No.: 18/303,490

(22) Filed: Apr. 19, 2023

(65) Prior Publication Data

US 2023/0338845 A1 Oct. 26, 2023

(30) Foreign Application Priority Data

Apr. 20, 2022 (JP) ................................. 2022-069289

(51) Int. Cl.
*A63F 13/52* (2014.01)
*A63F 13/525* (2014.01)
*A63F 13/58* (2014.01)

(52) U.S. Cl.
CPC ............ *A63F 13/525* (2014.09); *A63F 13/58* (2014.09)

(58) Field of Classification Search
None
See application file for complete search history.

(56) References Cited

U.S. PATENT DOCUMENTS 11,278,809 B2 * 3/2022 Takafuji ................ A63F 13/577
11,318,380 B2 * 5/2022 Nishimura ............ A63F 13/332
11,628,363 B2 * 4/2023 Aoyanagi ............. A63F 13/833 463/31
12,246,251 B2 * 3/2025 Gu ........................ A63F 13/837
2021/0213357 A1 * 7/2021 Morishita ........... A63F 13/5252
2021/0362056 A1 * 11/2021 Zhou ..................... A63F 13/525

(Continued)

FOREIGN PATENT DOCUMENTS

JP 2003-334381 11/2003
JP 2016-126513 7/2016
JP 2018-102364 7/2018

OTHER PUBLICATIONS

"[Samurai Warriors 5] Best Fire Character Hanbei Takenaka's Special Techniques for Defeating the Boss!", naotin, YouTube, Jul. 9, 2021, (retrieved on Aug. 30, 2023), URL: https://www.youtube.com/watch?v=WL30b8LR-_s.

(Continued)

*Primary Examiner* — Omkar A Deodhar
(74) *Attorney, Agent, or Firm* — MORI & WARD, LLP

(57) ABSTRACT

A game processing method executed by an information processing device, the game processing method includes executing a battle between a first game character and a second game character, determining whether the second game character is able to be brought into a predetermined state by an attack in a case of receiving an instruction input to cause the first game character to execute the attack on the second game character, and controlling a virtual camera for displaying images of the first game character and the second game character such that the virtual camera is in a predetermined position and a predetermined orientation when the first game character executes the attack in a case where the second game character is determined to be able to be brought into the predetermined state.

8 Claims, 11 Drawing Sheets

(56) References Cited

U.S. PATENT DOCUMENTS

| | | | | |
|---|---|---|---|---|
| 2022/0054944 A1* | 2/2022 | Zhang | .................. | A63F 13/426 |
| 2022/0203233 A1* | 6/2022 | Tanaka | .................. | A63F 13/525 |

OTHER PUBLICATIONS

"[Samurai Warriors 5] #39 Nobunaga, Chapter 5, Battle of Nagashino", YouTube, Jun. 25, 2021, (retrieved on Aug. 30, 2023), URL: https://www.youtube.com/watch?v=bR86-IssGxo.
Japanese Office Action for corresponding JP Application No. 2022-069289, Sep. 8, 2023.

* cited by examiner

[FIG. 1]
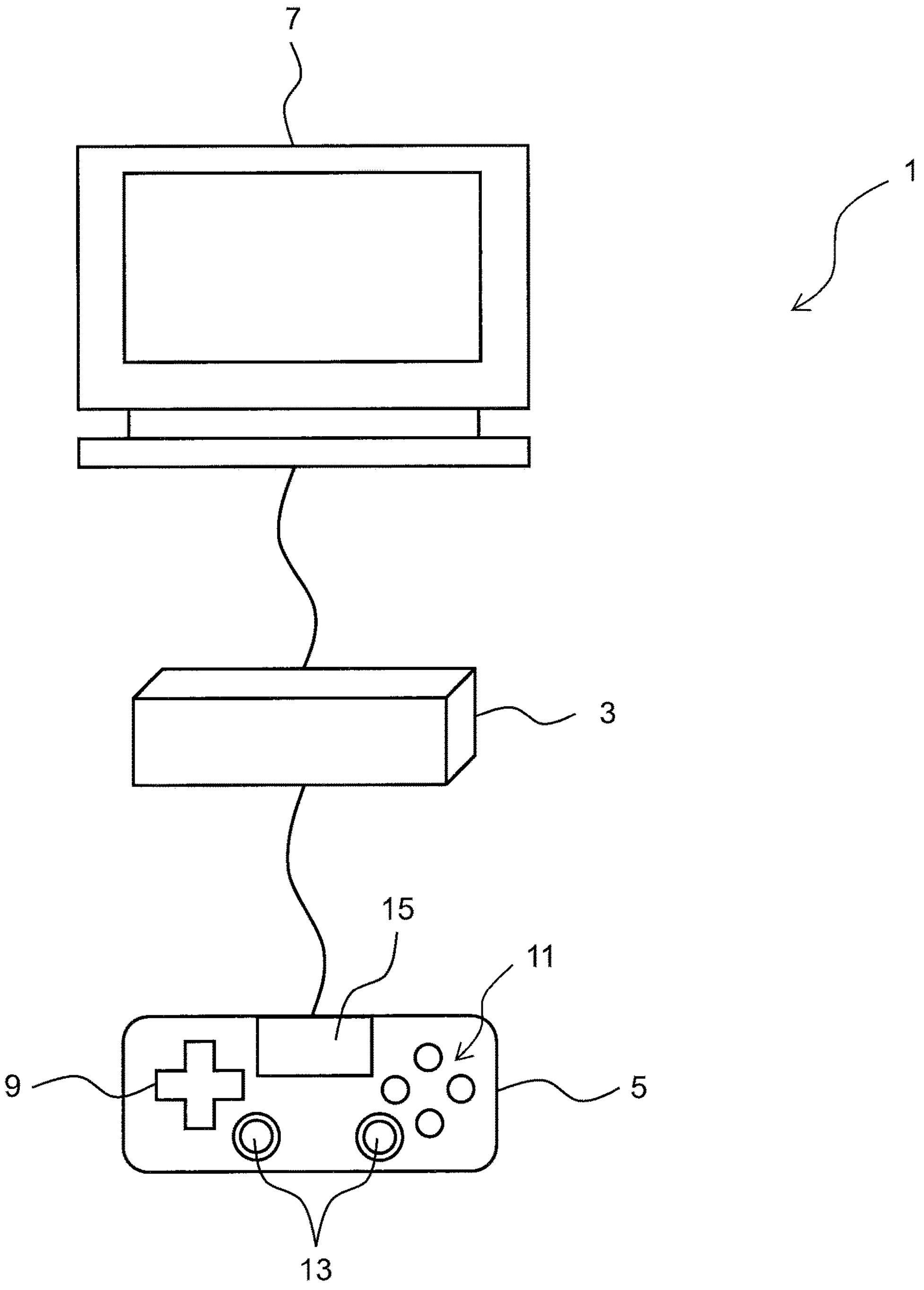

[FIG. 2]
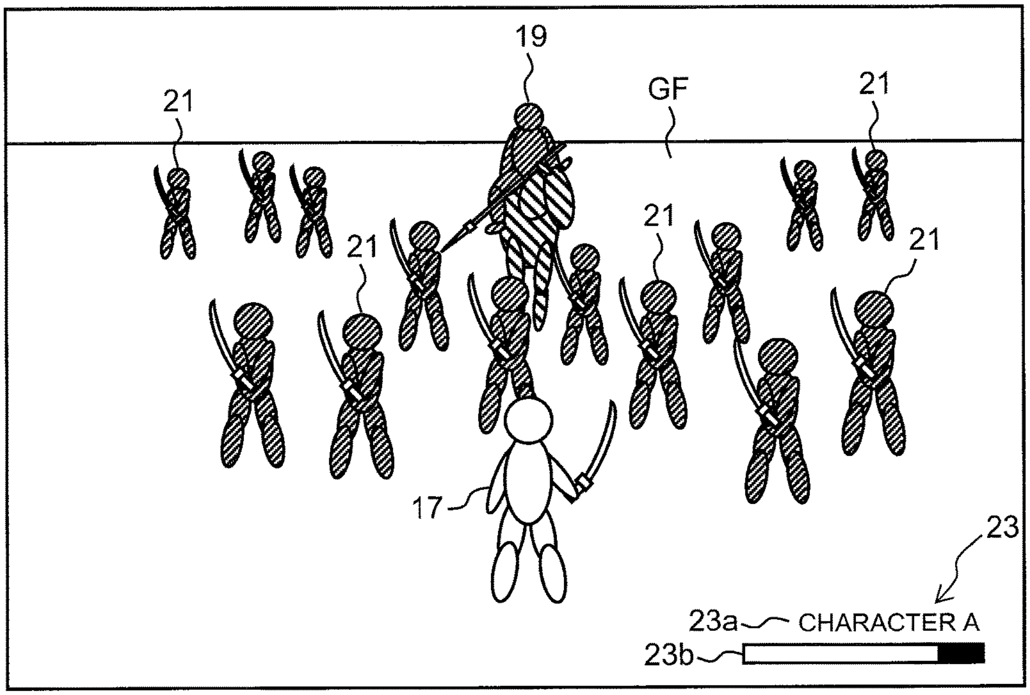
[FIG. 3]
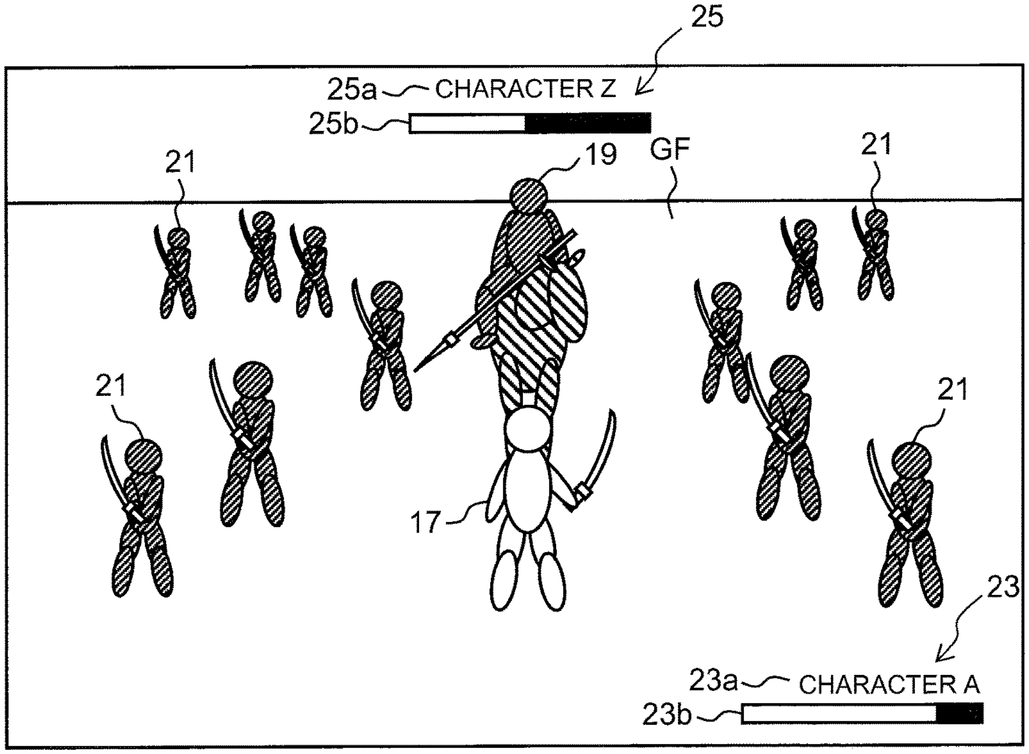

[FIG. 4]
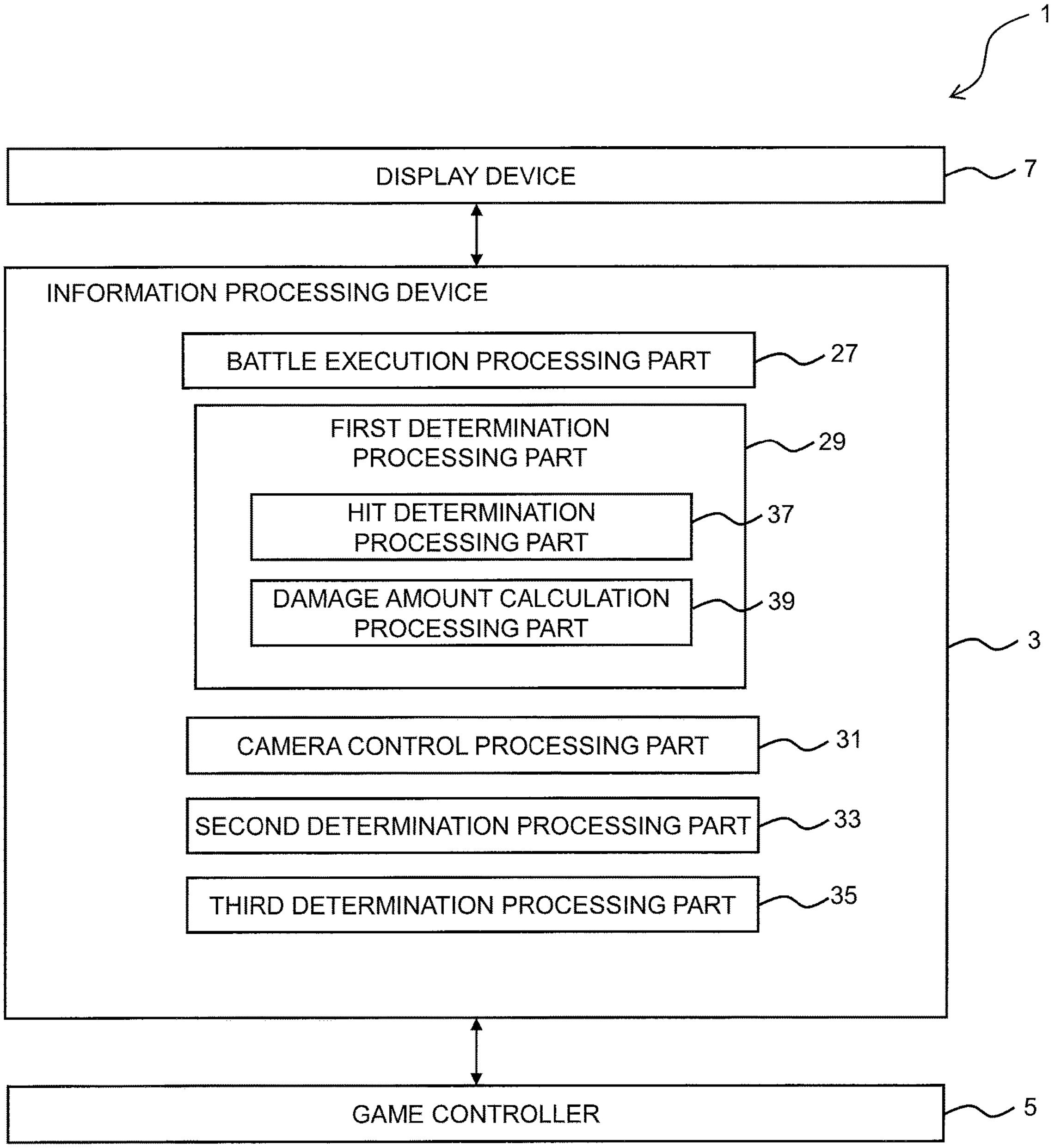

[FIG. 5]
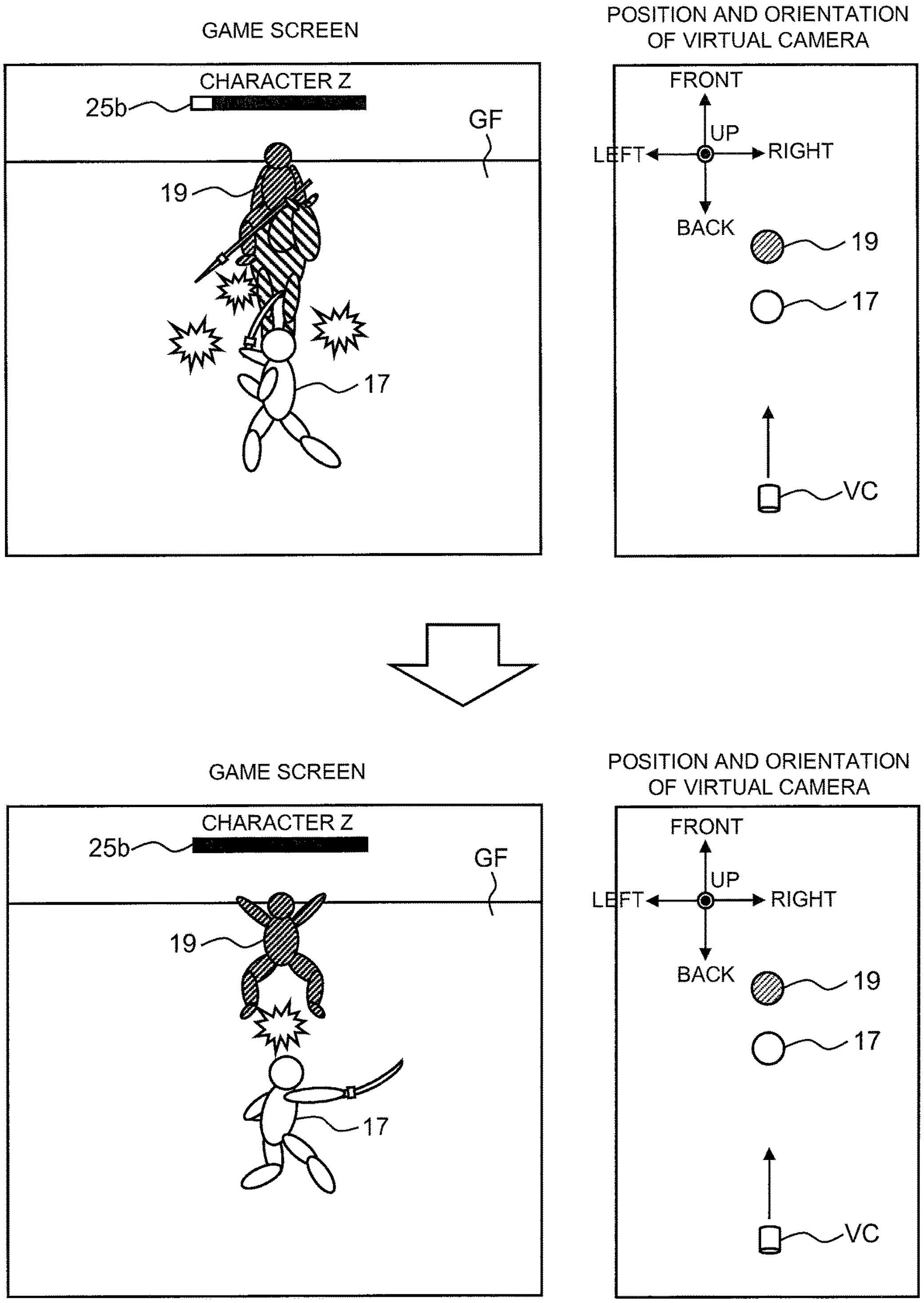

[FIG. 6]
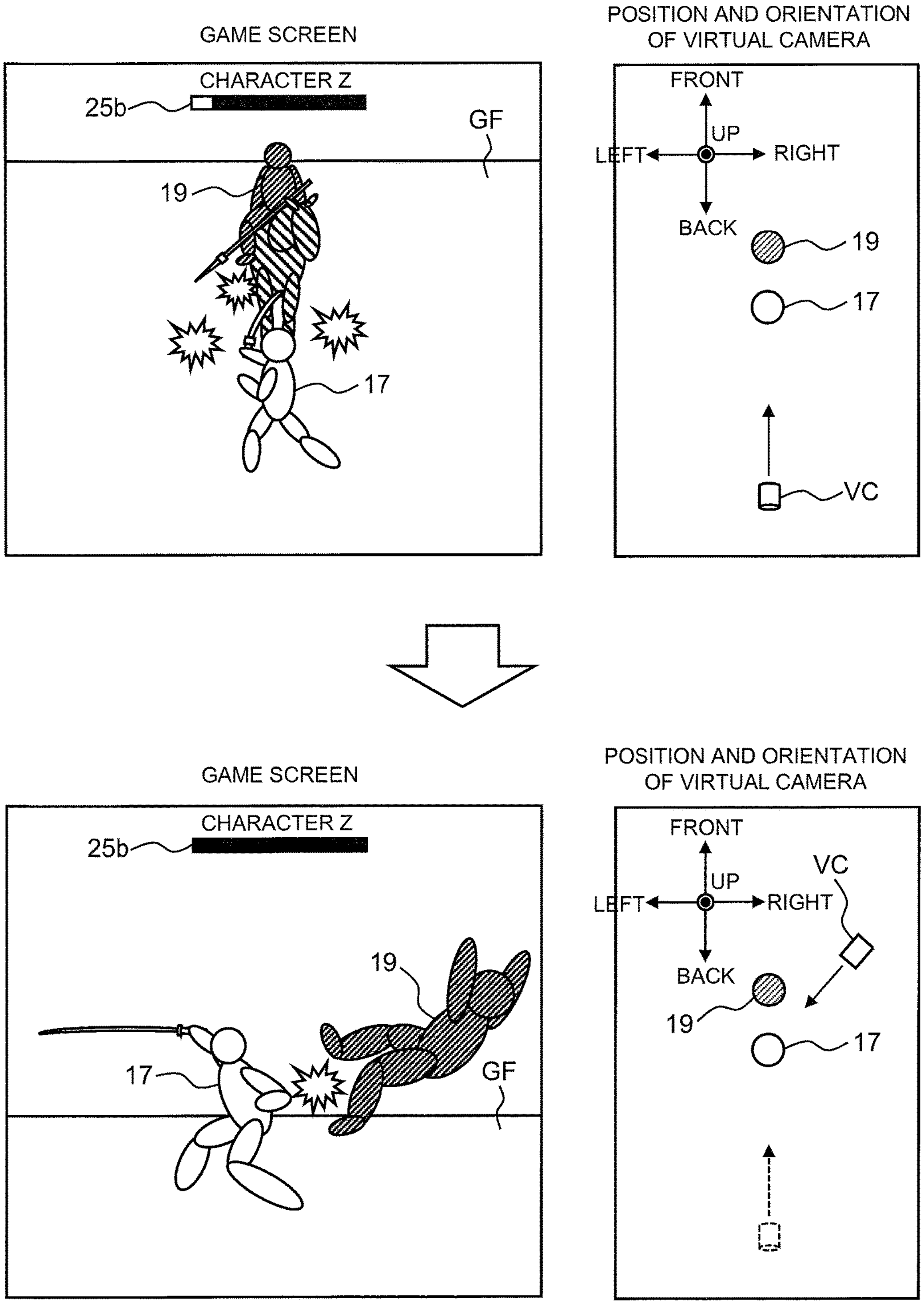

[FIG. 7]
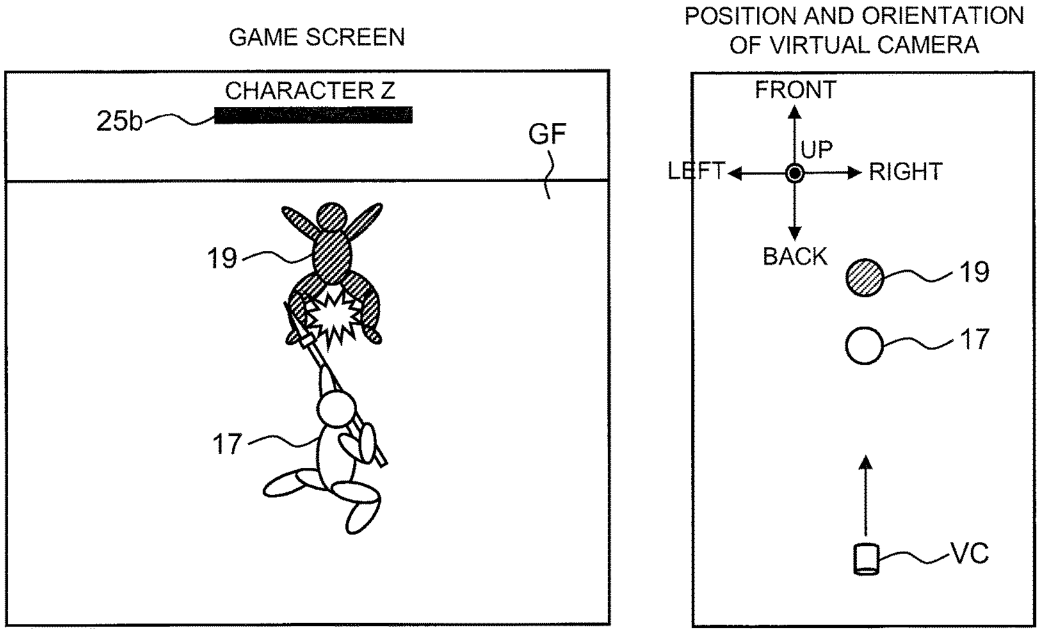
[FIG. 8]
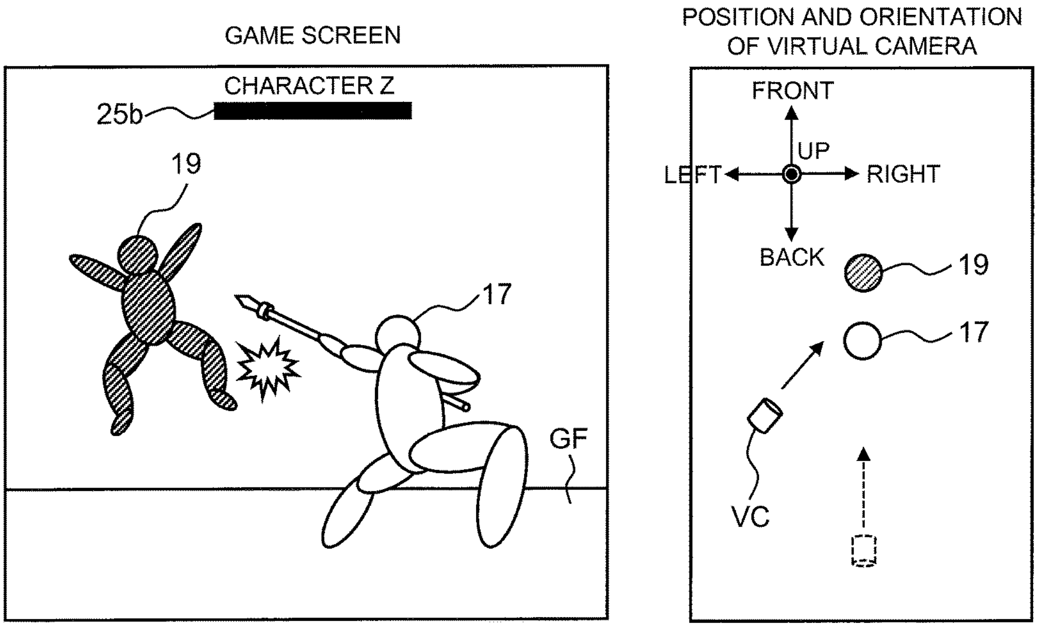

[FIG. 9]
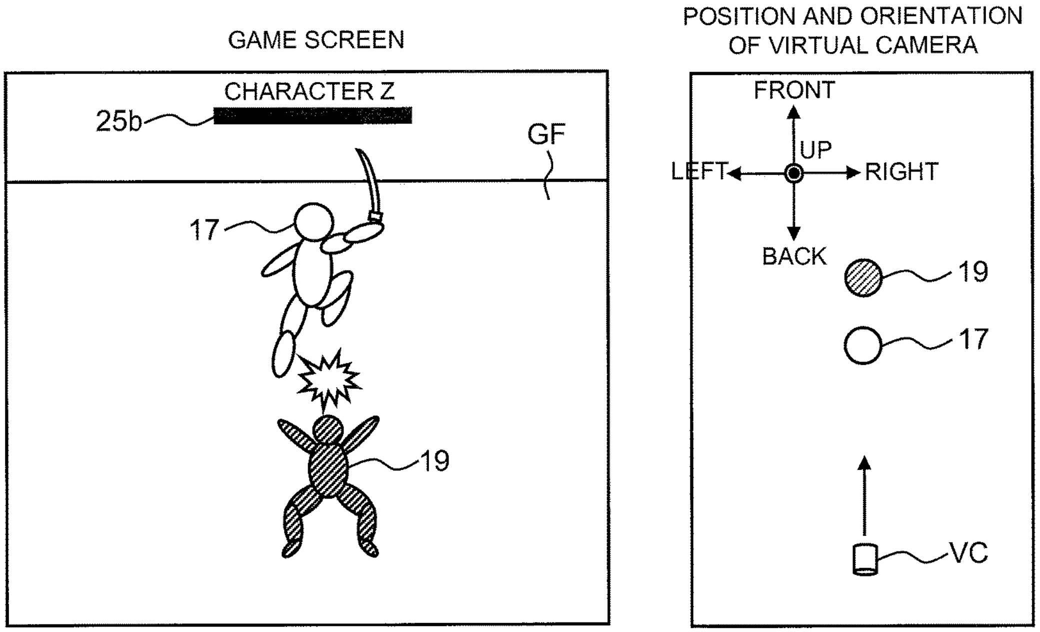
[FIG. 10]
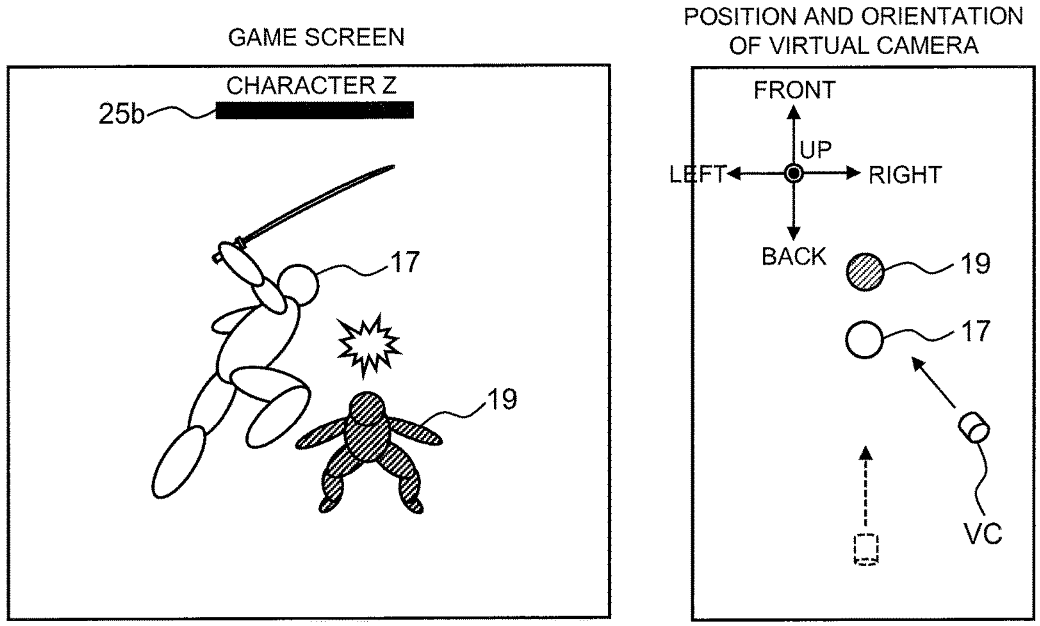

[FIG. 11]
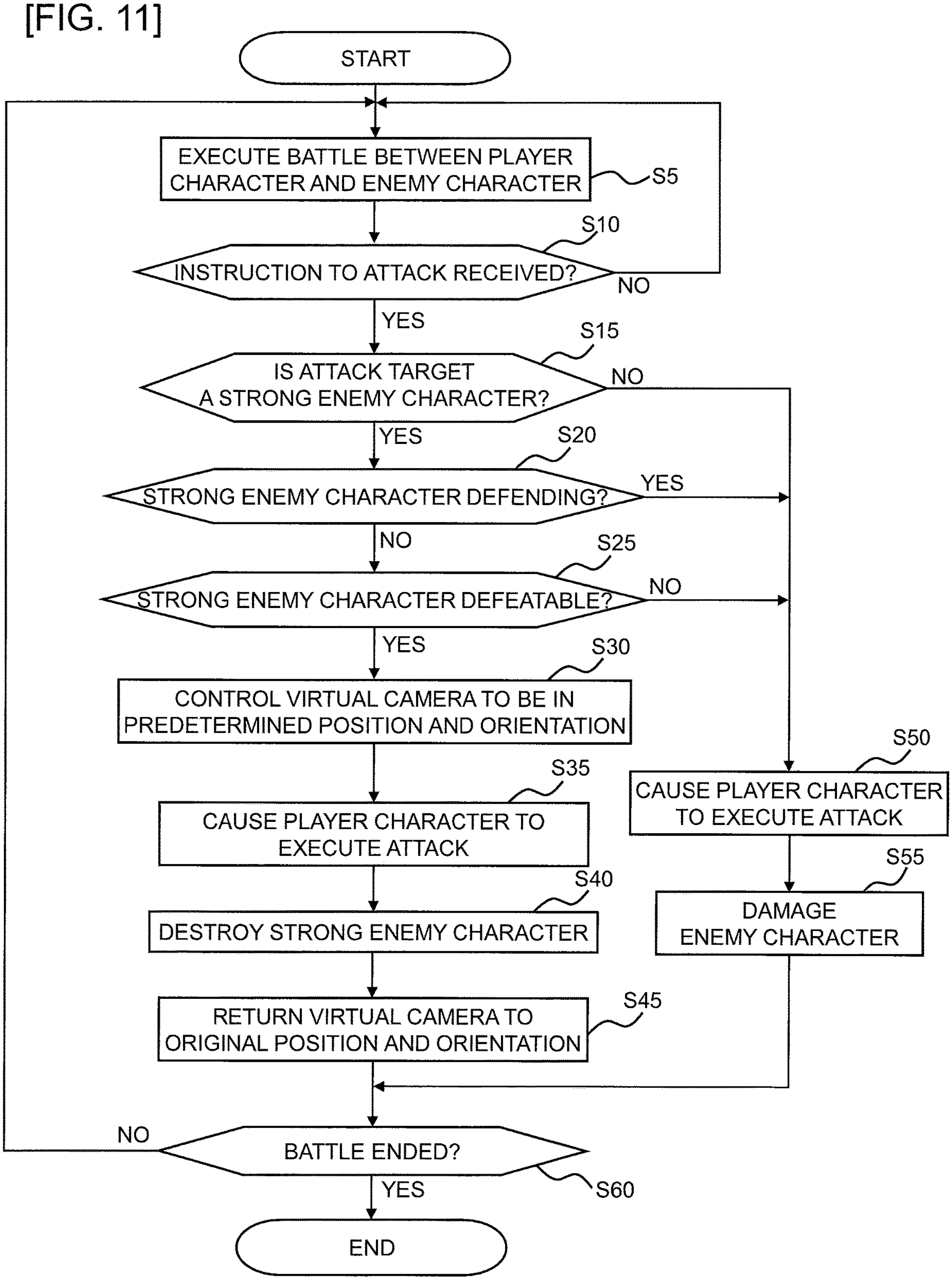

[FIG. 12]
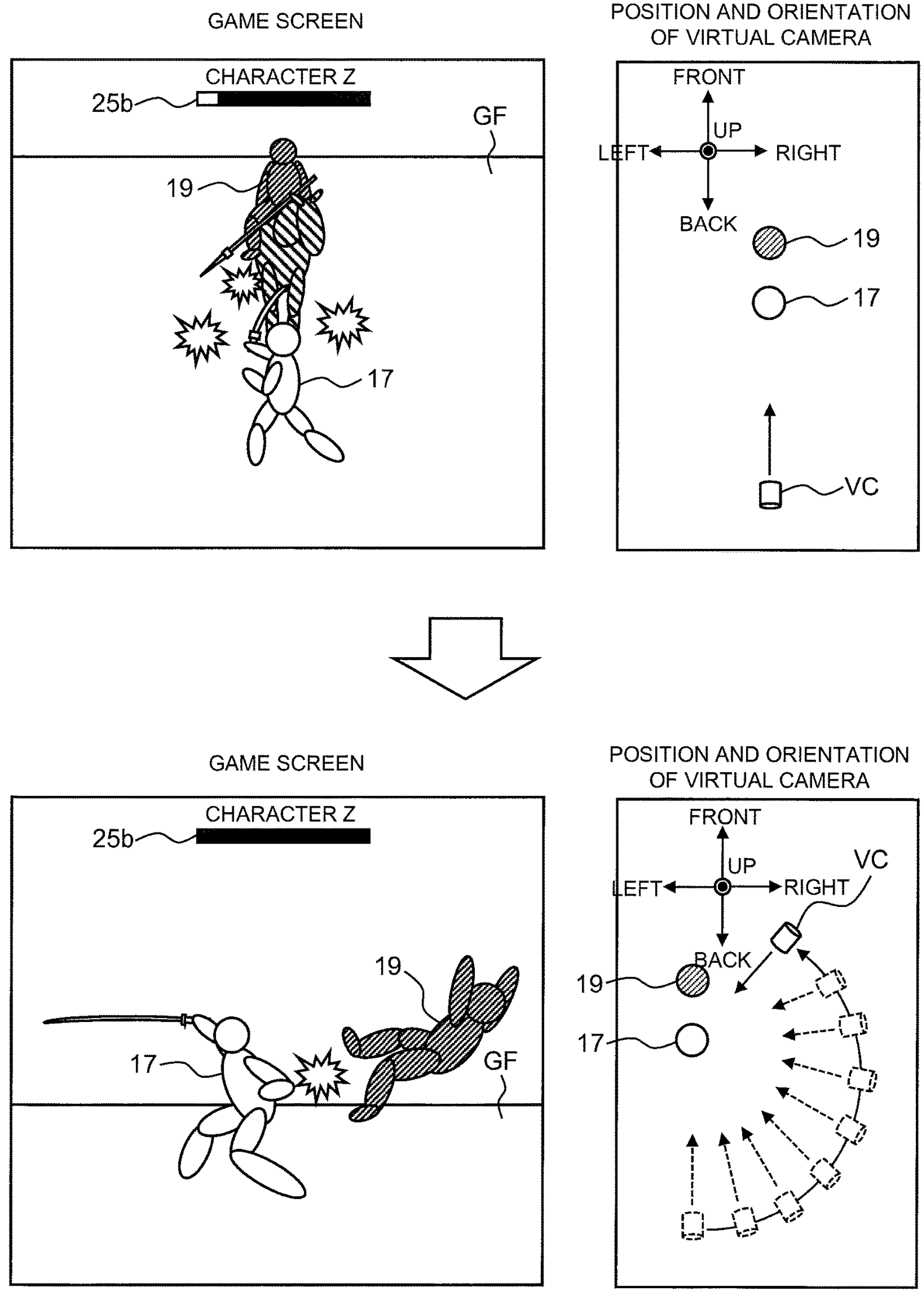

[FIG. 13]
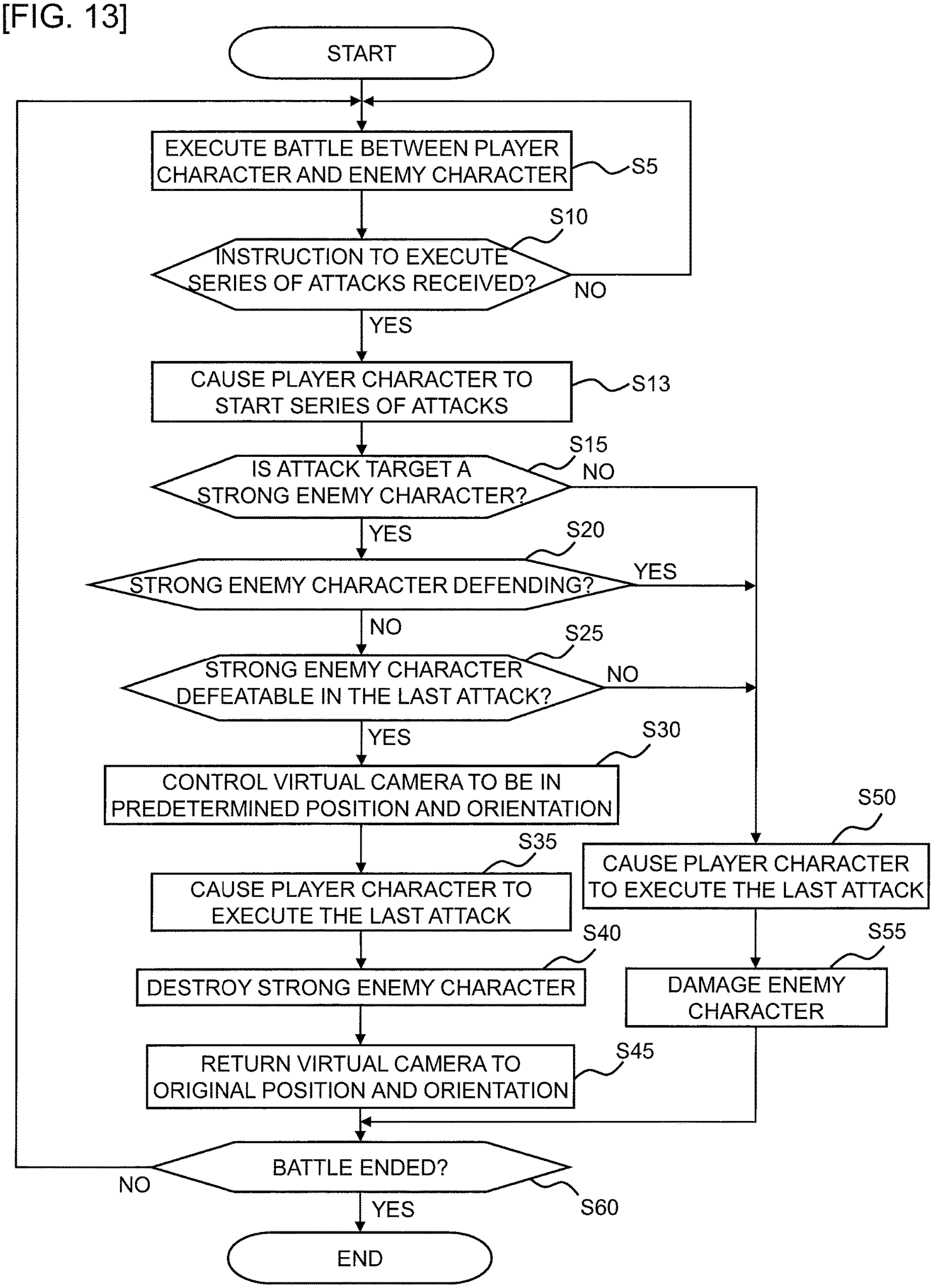

[FIG. 14]
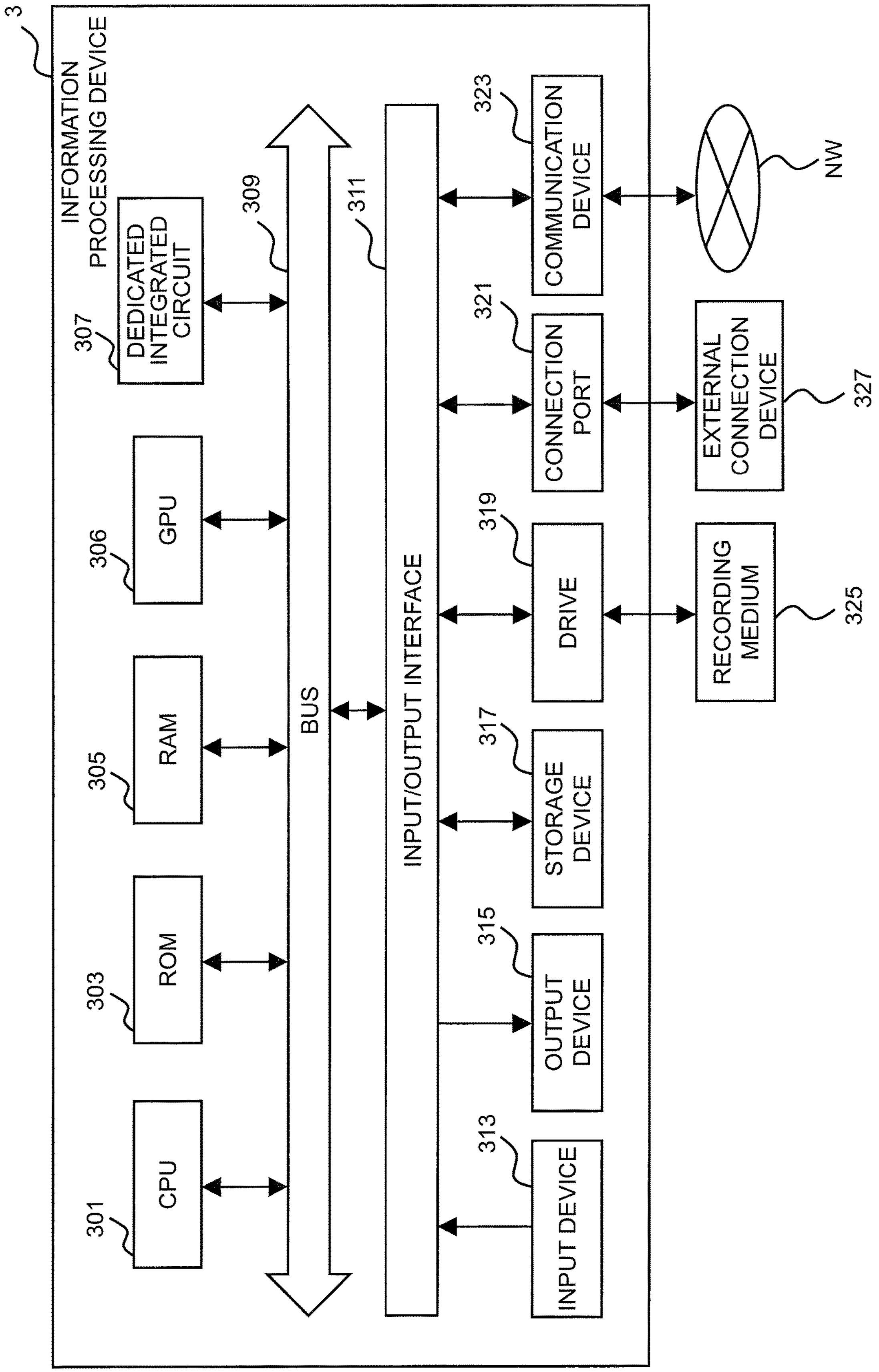

GAME PROCESSING METHOD AND RECORDING MEDIUM

CROSS-REFERENCE TO RELATED APPLICATION

The present application is based upon and claims the benefit of priority to Japanese Patent Application No. 2022-069289, filed Apr. 20, 2022. The entire contents of this application are incorporated herein by reference.

BACKGROUND OF THE INVENTION

Technical Field

The present invention relates to a game processing method and a recording medium.

Description of Background Art

For example, JP, A, 2018-102364 describes a game including a virtual camera that is controlled to track a game character moving in a virtual space. In the case where an attack operation is received, the game character is directed toward an enemy character, which is the target of the attack operation. At the same time, the virtual camera is controlled to photograph the game character from a predetermined direction.

SUMMARY OF THE INVENTION

In battle games such as that described in the above prior art, there has been a demand that can make the game character look more attractive.

The present invention has been made in view of the above problems, and an object of the present invention is to provide a game processing method and a recording medium that can make a game character look more attractive in a battle game.

Means for Solving the Problem

According to one aspect of the present embodiment, there is provided a game processing method executed by an information processing device. The game processing method includes executing a battle between a first game character and a second game character, determining whether the second game character is able to be brought into a predetermined state by an attack in a case of receiving an instruction input to cause the first game character to execute the attack on the second game character, and controlling a virtual camera for displaying images of the first game character and the second game character such that the virtual camera is in a predetermined position and a predetermined orientation when the first game character executes the attack in a case where the second game character is determined to be able to be brought into the predetermined state.

According to another aspect of the present invention, there is provided a non-transitory recording medium readable by an information processing device, the recording medium storing a game program. The game program is programmed to cause the information processing device to execute a battle between a first game character and a second game character, determine whether the second game character is able to be brought into a predetermined state by an attack in a case of receiving an instruction input to cause the first game character to execute the attack on the second game character, and control a virtual camera for displaying images of the first game character and the second game character such that the virtual camera is in a predetermined position and a predetermined orientation when the first game character executes the attack in a case where the second game character is determined to be able to be brought into the predetermined state.

Advantages of the Invention

According to the game processing method and the recording medium of the present invention, a game character can be made to look more attractive in battle games.

BRIEF DESCRIPTION OF THE DRAWINGS

FIG. 1 is a view showing an example of an entire configuration of a game system according to an embodiment.

FIG. 2 is a view showing an example of a game screen during a battle.

FIG. 3 is a view showing another example of a game screen during a battle.

FIG. 4 is a block diagram showing an example of the functional configuration of an information processing device.

FIG. 5 is a view showing an example of a game screen of Comparative Example, in which neither a first determination processing part nor a camera control processing part executes processing in the case where a player character executes an attack using the right hand.

FIG. 6 is a view showing an example of a game screen of the embodiment, in which a first determination processing part and a camera control processing part execute processing in the case where a player character executes an attach using the right hand.

FIG. 7 is a view showing an example of a game screen of Comparative Example, in which neither a first determination processing part nor a camera control processing part executes processing in the case where the player character launches from a crouched posture and executes an attack.

FIG. 8 is a view showing an example of a game screen of the embodiment, in which a first determination processing part and a camera control processing part execute processing in the case where a player character launches from a crouched posture and executes an attack.

FIG. 9 is a view showing an example of a game screen of Comparative Example, in which neither a first determination processing part nor a camera control processing part executes processing in the case where a player character executes an attack launched from the air.

FIG. 10 is a view showing an example of a game screen of the embodiment, in which a first determination processing part and a camera control processing part execute processing in the case where a player character executes an attach launched from the air.

FIG. 11 is a flowchart showing an example of the processing procedure executed by the information processing device.

FIG. 12 is a view showing an example of the way of movement of the virtual camera and the game screen in a modification example where the player character executes a series of attacks caused by firing a plurality of attack elements in succession.

FIG. 13 is a flowchart showing an example of the processing procedure executed by the information processing device in the modification example where the player character executes the series of attacks by firing the plurality of attack elements in succession.

FIG. 14 is a block diagram showing an example of a hardware configuration of the information processing device.

DETAILED DESCRIPTION OF THE EMBODIMENTS

Hereinafter, an embodiment of the present invention will be described with reference to the accompanying drawings.

1. Entire Configuration of Game System

Referring to FIG. 1, an example of the entire configuration of a game system 1 in relation to the embodiment will be described. As shown in FIG. 1, the game system 1 has an information processing device 3, a game controller 5, and a display device 7. The game controller 5 and the display device 7 are connected to the information processing device 3 by wired or wireless communication.

The information processing device 3 is, for example, a stationary game machine. However, it is not limited to this, and may also be a portable game machine equipped with an input unit, a display unit, etc., in one piece, for example. In addition to game machines, the information processing device 3 may also be computer equipment such as a server computer, a desktop computer, a laptop computer, or a tablet computer, or any equipment with a telephone function such as a smartphone, a cell phone, or a phablet.

The player uses the game controller 5 to perform various operational inputs. In the example shown in FIG. 1, the game controller 5 has, for example, a cross key 9, a plurality of operation buttons 11, joysticks 13, a touch pad 15, and the like.

2. Outline of Game

Next, a description will be given on an example of the outline of the game in relation to the present embodiment, i.e., the game that is provided through execution of a game program or game processing method of the present invention by the information processing device 3.

The game in relation to the present embodiment is, for example, a so-called action role-playing game in which a story advances while an allied game character and an enemy game character battle with each other. During the battle, the player operates an allied game character in real time to make it perform actions. Game characters appearing in the game are typically human male or female characters, but may be non-human. For example, they can be animals, creatures other than humans or animals, virtual creatures, robots, machines, objects such as goods or articles, etc.

FIGS. 2 and 3 each show an example of a game screen during a battle. As shown in FIGS. 2 and 3, for example, an allied character (shown as white) and an enemy character (shown as hatched area), which are 3D models, for example, battle against each other on a game field GF, which is a three-dimensional virtual space. Allied characters include a player character 17, which is operated by the player. Enemy characters include, for example, a strong enemy character 19 and a number of weak enemy characters 21. The battle takes place directly on the game field GF when the player character 17 encounters an enemy character. The player character 17 acts in real time in conjunction with the player's operation, and moves on the game field GF to attack enemy characters, for example. The enemy characters are automatically controlled based on a predetermined algorithm (so-called game AI) defined by a game program, and move on the game field GF to attack the allied character, for example.

Note that the allied characters may include a so-called non-player character that is automatically controlled based on a predetermined algorithm defined by a game program. In that case, the player character that can be manipulated by the player may be switched to one of a plurality of allied characters.

In an example shown in FIG. 2, the player character 17 battles against the weak enemy characters 21. On the game screen, status information 23 about the player character 17 is displayed. The status information 23 includes, for example, a name 23*a* of the player character 17 and a physical strength gauge 23*b* that indicates the remaining physical strength value.

In an example shown in FIG. 3, the player character 17 battles against the strong enemy characters 19. In this case, status information 25 about the strong enemy character 19 is displayed on the game screen, in addition to the status information 23 about the player character 17. The status information 25 includes, for example, a name 25*a* of the strong enemy character 19 and a physical strength gauge 25*b* that indicates the remaining physical strength value.

A virtual camera VC (see FIGS. 5-10 below) is disposed in the virtual space so as to display images of the virtual space, including the player character 17 and the strong enemy character 19. The image virtually photographed by the virtual camera VC is displayed on the game screen. The virtual camera VC is disposed at a predetermined location relative to the player character 17, for example, at the upper back side of the player character 17. The virtual camera VC is set such that its gaze point coincides with, for example, the position of the player character 17. The position and orientation of the virtual camera VC are controlled to follow the movement of the player character 17. Thus, an image of the player character 17 as viewed from the upper back side, for example, is displayed as shown in FIGS. 2 and 3. It is noted that the position and orientation of the virtual camera VC may be modified within a predetermined variable range by a player's operation. In the present embodiment, for convenience of explanation, the term "normal state" refers to a state in which the virtual camera V automatically follows the movement of the player character 17 as described above.

The player character 17 is capable of executing various types of attacks. The player can cause the player character 17 to execute various types of attacks by selecting the type of attack, for example, by a combination or the like of a plurality of operations of the game controller 5. The types of attacks include, for example, attacks using various weapons, physical blows, attacks using various items, attacks invoking various skills, magic, etc. Other types of attacks include, for example, attacks using a weapon held in the right, left, or both hands, attacks launched from a crouched posture, attacks launched from the air, attacks with a narrow or wide effective area, and a series of attacks caused by firing a plurality of attack elements in succession.

In the game related to the present embodiment, when the player character 17 defeats the strong enemy character 19 by attack in a battle between the player character 17 and the strong enemy character 19, the virtual camera VC is controlled to be in a predetermined position and orientation, which can make the player character 17 look more attractive at the instant when it defeats the strong enemy character 19. This mechanism will be described in detail below.

3. Functional Configuration of Information Processing Device

Next, an example of the functional configuration of the information processing device 3 will be described with reference to FIG. 4 and FIGS. 5-10.

As shown in FIG. 4, the information processing device 3 includes a battle execution processing part 27, a first determination processing part 29, a camera control processing part 31, a second determination processing part 33, and a third determination processing part 35.

The battle execution processing part 27 executes a battle between allied characters, including the player character 17 (an example of a first game character), and enemy characters, including a strong enemy character 19 (an example of a second game character) and a weak enemy character 21, etc. Specifically, the battle execution processing part 27 controls the action of the player character 17, such as its movement on the game field GF and its attack on the enemy character, in real time in conjunction with the player's operation. Further, the battle execution processing part 27 controls the action of the enemy character to automatically move it on the game field GF to attack the player character 17 or the like, based on the predetermined algorithm defined by the game program.

In the case of receiving an instruction input from the player to cause the player character 17 to execute an attack on the strong enemy character 19, the first determination processing part 29 determines whether or not the strong enemy character 19 is able to be brought into a predetermined state by this attack. The first determination processing part 29 determines whether or not the strong enemy character 19 is able to be brought into the predetermined state by this attack, before the player character 17 executes the attack for which the instruction is input, specifically, before the attack operation (motion) of the player character 17 starts. Note that the term "attack" includes various types of attacks as mentioned above, but it does not include attacks in which a video containing a camerawork as rendition is uniformly played when executed, such as deadly attacks or special attacks, regardless of whether the enemy character is defeated or not. The term "instruction input" includes the type of attack to be executed and data identifying the strong enemy character 19 as the attack target.

The term "predetermined state" includes a state in which the physical strength or equivalent parameter (called, for example, physical strength value, endurance value, vitality value, hit points, etc.) of the strong enemy character 19 falls below a predetermined threshold value. Typically, this state means that the parameter is zero, but it does not necessarily have to be zero, in other words, it only needs to be below the predetermined threshold value. Furthermore, the term "predetermined state" also includes a state in which the amount of damage that the strong enemy character 19 receives exceeds a predetermined threshold value. Typically, this state means that the amount of damage is more than or equal to the physical strength value at that time, but it does not necessarily have to be more than or equal to the physical strength value, in other words, it only needs to exceed the predetermined threshold value. The term "predetermined state" includes a state in which the strong enemy character 19 dies, is unable to fight, is defeated, or is otherwise considered to have lost in the battle. That is, in the case of receiving an instruction input from the player to cause the player character 17 to execute an attack on the strong enemy character 19, it can be said that the first determination processing part 29 determines whether or not the strong enemy character 19 is defeatable in this attack. Note that in the battle, for example, in the case where a second battle starts after defeating the enemy character, or in the case where the enemy character transforms after being defeated and continues the battle, the term "predetermined state" includes the state of the enemy character that causes the end of the first battle, and the state of the enemy character that causes the transformation of the enemy character.

The first determination processing part 29 includes a hit determination processing part 37 and a damage amount calculation processing part 39. The hit determination processing part 37 determines whether or not the attack hits the strong enemy character 19, based on the area of the attack instructed to be executed and the position of the strong enemy character 19 as the attack target. The term "area of attack" refers to the area within which the attack is effective, and is pre-set for each type of attack. The term "area of attack" includes data on the shape of the area (e.g., a circle about the player character 17, or a fan shape about the front of the player character 17, etc.) and the size of the area. For example, in the case where the strong enemy character 19, which is the attack target, is located within the area of the attack, the hit determination processing part 37 determines that the attack hits the target. On the other hand, in the case where the strong enemy character 19 is not located within the area of the attack, the hit determination processing part 37 determines the attack misses the target.

In the case where the hit determination processing part 37 determines that the attack hits the strong enemy character 19, the damage amount calculation processing part 39 calculates the amount of damage received by the strong enemy character 19 based on the attacking power of the attack and the defensive power of the strong enemy character 19. The term "attacking power" is pre-set for each type of attack. The term "defensive power" is pre-set for each type of game character. The damage amount calculation processing part 39 calculates the amount of damage received by the strong enemy character 19, for example, by subtracting the defensive power of the strong enemy character 19, which is the attack target, from the attacking power of the attack instructed to be executed. Note that the amount of damage becomes zero in the case where the defensive power is greater than or equal to the attacking power. In the case where there occur variations in the attacking power or defensive power or the like due to, for example, the rendition of a game, the launching of events, the invoking of skills or magic, the use of items, the effect of equipment, or the like, the damage amount calculation processing part 39 may calculate the amount of damage in consideration of such variations in the status.

The first determination processing part 29 determines whether or not the strong enemy character 19 is able to be brought into the predetermined state by the attack instructed to be executed, based on the amount of damage calculated by the damage amount calculation processing part 39 and the remaining physical strength value of the strong enemy character 19. The first determination processing part 29 determines that the strong enemy character 19 is defeatable (which is an example of making it possible to bring the strong enemy character 19 into the predetermined state) in the case where the amount of damage is greater than or equal to the remaining physical strength value of the strong enemy character 19. In contrast, the first determination processing part 29 determines that the strong enemy character 19 cannot be defeated (which is an example of making it impossible to bring the strong enemy character 19 into the predetermined state) in the case where the amount of damage is less than the remaining physical strength value. The first determination processing part 29 also determines that the strong enemy character 19 cannot be defeated in the case where the hit determination processing part 37 determines that the attack will be missed. The initial value of the physical strength value of the strong enemy character 19 is pre-set for each type of game character, and every time the character is attacked, its physical strength value is reduced only by the amount of damage corresponding to this attack. The remaining physical strength value is displayed on the physical strength gauge 25*b* described above.

In the case where the first determination processing part 29 determines that the strong enemy character 19 is able to be brought into the predetermined state, the camera control processing part 31 control the virtual camera VC to be in a predetermined position and orientation when the player character 17 executes an attack. The phrase "when executing the attack" means that the time during which the player character 17 is executing the attack. Specifically, the camera control processing part 31 changes the virtual camera VC from the normal-state position and orientation to the predetermined position and orientation before or substantially at the same time as the player character 17 starts the attacking action (motion). Then, after the player character 17 completes the attacking action (motion) and the strong enemy character 19 is completely defeated (motion), the camera control processing part 31 returns the virtual camera VC to the original normal-state position and orientation before the changing. The term "predetermined position and orientation" refer to the position and orientation at which the player character 17 executing the attack can look more attractive, and are pre-set for each type of attack. The camera control processing part 31 controls the virtual camera VC such that it is at the predetermined position and orientation corresponding to the type of attack for which the instruction input is received.

The change of the position and orientation of the virtual camera VC by the camera control processing part 31 may be executed by instantaneous switching or continuous movement of the virtual camera VC over a predetermined time period. In the case of a normal attack where the player character 17 executes an attack immediately in conjunction with the instruction input for the attack from the player, the change is executed by the instantaneous switching. On the other hand, for example, in the case of executing a series of attacks by firing a plurality of attack elements in succession with the last attack element being set as the object to be processed, there is a predetermined time interval from the receipt of the instruction input about the series of attacks to the execution of the last attack element. Because of this, the change of the virtual camera VC may be executed by the continuous movement thereof over the predetermined time interval (see FIG. 12 to be mentioned later).

Referring to FIGS. 5-10, the control of the position and orientation of the virtual camera VC by the camera control processing part 31 is shown by way of example. FIGS. 5-10 show the position and orientation of the virtual camera VC and the game screen displayed by the virtual camera VC. Each direction shown in FIGS. 5-10 is based on the direction in which the player character 17 faces, with the front surface of the player character 17 being defined as the front, the back surface as the back, and the directions perpendicular to the front-back direction (Z-axis direction) and up-down direction (Y-axis direction) as the left-right direction (X-axis direction). In the following, the "predetermined state" refers to the state in which the physical strength value becomes zero and the character is defeated.

FIGS. 5-6 show examples in which the player character 17 executes an attack using the right hand. FIG. 5 is for comparison and shows the case where neither the first determination processing part 29 nor the camera control processing part 31 executes processing. As shown in FIG. 5, in the normal state, the virtual camera VC is positioned at a predetermined distance from and around (e.g., behind) the player character 17 and is oriented to look down slightly from a predetermined height at a predetermined overhead angle. The virtual camera VC is controlled to follow the movement of the player character 17 while maintaining its positional relationship. As shown in the upper part of FIG. 5, every time the player character 17 repeatedly executes an attack, the physical strength value of the strong enemy character 19 is reduced by a predetermined amount in accordance with the attack(s) received. When the physical strength value of the strong enemy character 19 becomes zero due to the attack(s), the strong enemy character 19 is defeated as shown in the lower part of FIG. 5. FIG. 5 shows an image of the player character 17 viewed from the position and orientation not different from the normal state, for example, from the upper back side, even at the instant when the player character 17 defeats the strong enemy character 19 because the virtual camera VC has its position and orientation maintained in the normal state.

FIG. 6 corresponds to the present embodiment and shows the case where the first determination processing part 29 and the camera control processing part 31 executes processing. As shown in the upper part of FIG. 6, every time the player character 17 repeatedly executes an attack, the physical strength value of the strong enemy character 19 is reduced by a predetermined amount in accordance with the attack(s) received. At this time, every time it receives an instruction input from the player character 17, the first determination processing part 29 determines whether or not the strong enemy character 19 is defeatable in this attack. Then, when receiving an attack instruction input at a certain point in time, if the first determination processing part 29 determines that the strong enemy character 19 is defeatable, the virtual camera VC is controlled by the camera control processing part 31 to be at the predetermined position and orientation. The predetermined position and orientation are set so that the player character 17 looks more attractive. In an example shown in the lower part of FIG. 6, for example, because the player character 17 executes an attack with a weapon held in the right hand, the virtual camera VC is moved to the front right side of the player character 17. For example, the overhead angle of the virtual camera VC is also changed such that the attack of the player character 17 looks more attractive. In this example, the virtual camera VC is also changed such that it is oriented in a substantially horizontal direction from the substantially same height as the head of the player character 17. The virtual camera VC may be moved closer to the player character 17 than in the normal state so that the player character 17 is zoomed in. The gaze point of the virtual camera VC in this case may be set at the position of the player character 17 or the position of the strong enemy character 19, or at an intermediate position between them. The distance from the gaze point of the virtual camera VC is set such that, for example, both the player character 17 and the strong enemy character 19, which is the attack target, can fit in the game screen, and such that the entirety of the attack action and the effects thereof executed by the player character 17 can fit in the game screen.

Regardless of the type of attack, the virtual camera VC is moved diagonally forward (toward the front right side or the front left side) or diagonally backward (toward the back right side or back left side) respect to the player character 17. Since the strong enemy character 19, which is the opponent, is often positioned in front of the player character 17, the arrangement allows both the player character 17 and the strong enemy character 19 to fit in the game screen while preventing both characters from overlapping each other.

In the example, the virtual camera VC is moved to the front right side of the player character 17 because the player character 17 executes the attack using the right hand. Conversely, in the case where the player character 17 executes an attack using the left hand, the virtual camera VC may be moved to the front left side of the player character 17. In this way, the position and orientation of the virtual camera VC may be set in accordance with which hand the player character 17 uses for the attack.

Referring to FIGS. 7-8, other examples of the control performed by the camera control processing part 31 are shown. FIGS. 7-8 show examples in which the player character 17 launches an attack from a crouched posture.

FIG. 7 is for comparison and shows the case where neither the first determination processing part 29 nor the camera control processing part 31 executes processing. As shown in FIG. 7, when the physical strength value of the strong enemy character 19 becomes zero due to the attack of the player character 17, the strong enemy character 19 is defeated. FIG. 7 shows an image of the player character 17 viewed from the position and orientation not different from the normal state, for example, from the upper rear side, even at the instant when the player character 17 defeats the strong enemy character 19 because the virtual camera VC has its position and orientation maintained in the normal state.

FIG. 8 corresponds to the present embodiment and shows the case where the first determination processing part 29 and the camera control processing part 31 executes processing. As mentioned above, when receiving an attack instruction input at a certain point in time, if the first determination processing part 29 determines that the strong enemy character 19 is defeatable, the virtual camera VC is controlled by the camera control processing part 31 to be at the predetermined position and orientation. In an example shown in FIG. 8, the player character 17 executes an attack from a crouched position, for example, by thrusting a spear up. To make this attack look more attractive, the virtual camera VC is moved to, for example, the back left side of the player character 17, and the position and orientation of the virtual camera VC are changed in such a manner as to look up the player character 17 and the strong enemy character 19 from below. The virtual camera VC may be moved closer to the player character 17 than in the normal state so that the player character 17 is zoomed in. The gaze point of the virtual camera VC may be set at the position of the player character 17 or the position of the strong enemy character 19, or at an intermediate position between them. The distance from the gaze point of the virtual camera VC is set such that, for example, both the player character 17 and the strong enemy character 19, which is the attack target, can fit in the game screen, and such that the entirety of the attack action and the effects thereof executed by the player character 17 can fit in the game screen.

Referring to FIGS. 9-10, other examples of the control performed by the camera control processing part 31 are further shown. FIGS. 9-10 show examples in which the player character 17 executed an attack launched from the air.

FIG. 9 is for comparison and shows the case where neither the first determination processing part 29 nor the camera control processing part 31 executes processing. As shown in FIG. 9, when the physical strength value of the strong enemy character 19 becomes zero due to the attack of the player character 17, the strong enemy character 19 is defeated. FIG. 9 shows an image of the player character 17 viewed from the position and orientation not different from the normal state, for example, from the upper back side, even at the instant when the player character 17 defeats the strong enemy character 19 because the virtual camera VC has its position and orientation maintained in the normal state.

FIG. 10 corresponds to the present embodiment and shows the case where the first determination processing part 29 and the camera control processing part 31 executes processing. As mentioned above, when receiving an attack instruction input at a certain point in time, if the first determination processing part 29 determines that the strong enemy character 19 is defeatable, the virtual camera VC is controlled by the camera control processing part 31 to be at the predetermined position and orientation. In an example shown in FIG. 10, the player character 17 jumps in the air and executes an attack with the weapon in the right hand. To make this attack look more attractive, the virtual camera VC is moved to, for example, the back right side of the player character 17, and the position and orientation of the virtual camera VC are changed in such a manner as to look down the strong enemy character 19 from the back and upper side of the player character 17. The virtual camera VC may be moved closer to the player character 17 than in the normal state so that the player character 17 is zoomed in. The gaze point of the virtual camera VC may be set at the position of the player character 17 or the position of the strong enemy character 19, or at an intermediate position between them. The distance from the gaze point of the virtual camera VC is set such that, for example, both the player character 17 and the strong enemy character 19, which is the attack target, can fit in the game screen, and such that the entirety of the attack action and the effects thereof executed by the player character 17 can fit in the game screen.

Returning to FIG. 4, when receiving an instruction input from the player to cause the player character 17 to execute an attack on the strong enemy character 19, the second determination processing part 33 determines whether or not the strong enemy character 19, which is the attack target, is in a predetermined status. The term "predetermined status" refers to a state in which the strong enemy character 19 is less likely to be damaged, for example, a state in which the strong enemy character 19 takes a defensive posture or in which the strong enemy character 19 invokes a predetermined defensive skill. The first determination processing part 29 determines whether or not the strong enemy character 19 is able to be brought into the predetermined state in the case where the second determination processing part 33 determines that the strong enemy character 19 is not in the predetermined status. On the other hand, the first determination processing part 29 does not determine whether or not the strong enemy character 19 is able to be brought into the predetermined state in the case where the second determination processing part 33 determines that the strong enemy character 19 is in the predetermined status. Therefore, the movement processing of the virtual camera VC to be performed by the camera control processing part 31 is not executed in the case where the strong enemy character 19 is in the predetermined status.

When receiving an instruction input from the player to cause the player character 17 to execute an attack on the strong enemy character 19, the third determination processing part 35 determines whether or not the strong enemy character 19, which is the attack target, is of a predetermined type. The term "predetermined type" includes enemy characters with a predetermined strength or of a certain rank or level or higher, and main enemy characters associated with the story, and specifically refers to enemy characters other than non-critical characters, such as so-called boss characters and mid-boss characters. In the present embodiment, the strong enemy character 19 belongs to the predetermined type, while the weak enemy characters 21 does not belong to the predetermined type. The first determination processing part 29 determines whether or not the strong enemy character 19 is able to be brought into the predetermined state in the case where the third determination processing part 35 determines that the enemy character is the strong enemy character 19. On the other hand, the first determination processing part 29 determines whether or not the strong enemy character is able to be brought into the predetermined state in the case where the third determination processing part 35 determines that the enemy character is not the strong enemy character 19. Therefore, the movement processing of the virtual camera VC to be performed by the camera control processing part 31 is not executed in the case where the enemy character is not the strong enemy character 19.

The processes, etc. effected by the processing parts described hereinabove are not limited to the example of sharing these processes. For example, they may be processed by a smaller number of processing parts (e.g. one processing part) or may be processed by further subdivided processing parts. The functions of the processing parts are implemented by a game program run by a CPU 301 (see FIG. 14 described later). However, for example, some of them may be implemented by an actual device such as a dedicated integrated circuit such as ASIC or FPGA, other electric circuits, etc.

4. Processing Procedure Executed by Information Processing Device

Next, an example of the processing procedure executed by the information processing device 3 will be described with reference to FIG. 11.

As shown in FIG. 11, in step S5, the information processing device 3 causes the battle execution processing part 27 to execute a battle between an allied character(s) including the player character 17 and enemy characters including the strong enemy character 19 and the weak enemy character 21. At this time, the information processing device 3 causes the camera control processing part 31 to control the position and orientation of the virtual camera VC.

In step S10, the first determination processing part 29 determines whether an instruction input from the player to cause the player character 17 to execute an attack on the enemy character has been received or not. In the case where the instruction input is not received (step S10: NO), the operation returns to step S5 described above. On the other hand, in the case where instruction input is received (step S10: YES), the operation proceeds to the next step S15.

In step S15, the information processing device 3 causes the third determination processing part 35 to determine whether or not the enemy character, which is the attack target is the strong enemy character 19. In the case where the enemy character is determined not to be the strong enemy character 19 (step S15: NO), the operation proceeds to step S50 to be mentioned later. On the other hand, in the case where the enemy character is determined to be the strong enemy character 19 (step S15: YES), the operation proceeds to the next step S20.

In step S20, the information processing device 3 causes the second determination processing part 33 to determine whether or not the strong enemy character 19, which is the attack target, is in a defensive state. In the case where the strong enemy character 19 is determined to be in the defensive state (step S20: YES), the operation proceeds to step S50 to be mentioned later. On the other hand, in the case where the strong enemy character 19 is determined not to be in the defensive state (step S20: NO), the operation proceeds to the next step S25.

In step S25, the information processing device 3 causes the first determination processing part 29 to determine whether or not the strong enemy character 19, which is the attack target, is defeatable by the attack, which has been instructed to be executed, with the instruction input from the player to execute the attack being received. In the case where the strong enemy character 19 is determined not to be defeatable (step S25: NO), the operation proceeds to step S50 to be mentioned later. On the other hand, in the case where the strong enemy character 19 is determined to be defeatable (step S25: YES), the operation proceeds to the next step S30.

In step S30, the information processing device 3 causes the camera control processing part 31 to control the normal-state position and orientation of the virtual camera VC to the predetermined position and orientation.

In step S35, the information processing device 3 causes the battle execution processing part 27 to make the player character 17 execute an attack on the strong enemy character 19.

In step S40, the information processing device 3 causes the battle execution processing part 27 to make the strong enemy character 19 execute an operation of being defeated (an operation of being destroyed).

In step S45, the information processing device 3 causes the camera control processing part 31 to return the virtual camera VC from the predetermined position and orientation, to which the virtual camera VC has been changed in step S30, to its original position and orientation (the normal-state position and orientation). Thereafter, the operation proceeds to step S60 to be mentioned later.

On the other hand, in step S50, the information processing device 3 causes the battle execution processing part 27 to make the player character 17 execute an attack on the enemy character. In detail, in the case where the operation proceeds to this step S50 in the determination in step S15 (step S15: NO), the attack on the weak enemy characters 21 is executed. In the case where the operation proceeds to this step S50 in the determination in step S20 (step S20: YES) or in the determination in step S25 (step S25: NO), the attack on the strong enemy character 19 is executed. Note that the virtual camera VC is controlled to be in the normal-state position and orientation.

In step S55, the information processing device 3 causes the battle execution processing part 27 to damage the enemy character by decreasing the physical strength value of the enemy character by the amount of damage due to this attack.

In step S60, the information processing device 3 determines whether or not the battle should be ended. For example, in the case where one of the predetermined victory or defeat condition is met, the battle is ended; in the case where it is not met, the battle continues. In the case where the battle continues (step S60: NO), the operation returns to step S5 and repeats the same steps. On the other hand, in the case where the battle is to be ended (step S60: YES), this flow is ended.

The processing procedure described above is illustrative, and at least a part of the procedure may be deleted or changed, or procedures other than that described above may be added, without departing from the spirit and technical concept of the procedures. The order of at least parts of the procedure may be changed, and multiple procedures may be combined into a single procedure or performed in parallel.

5. Effects of Embodiment

As described above, in the game related to this embodiment, when receiving an instruction input from the player to cause the player character 17 to execute an attack on the strong enemy character 19, it is determined whether or not the strong enemy character 19 is able to be brought into the predetermined state by the attack during a battle between the player character 17 and the strong enemy character 19. Then, in the case where the strong enemy character 19 is determined to be able to be brought into the predetermined state, the virtual camera VC is controlled to be in a predetermined position and orientation so as to display the images of the player character 17 and the strong enemy character 19 when the player character 17 executes the attack.

Thus, the position and orientation of the virtual camera VC can be controlled so that the player character 17 looks more attractive at the instant when the attack executed by the player character 17 hits the strong enemy character 19. Therefore, the game character can look more attractive in battles between the game characters. The invention is particularly suitable for action games, fighting games, action role-playing games, etc., in which the player operates the player character in real time to cause it to take actions, and can significantly improve the appeal of such a game.

In the case of performing processing for switching the virtual camera VC when the strong enemy character 19 is defeated, in the prior art, the virtual camera VC is switched after the attack of the player character 17 hits the strong enemy character 19, which fails to make the player character 17 look attractive during the entire attack action. However, in the present embodiment, since the position and orientation of the virtual camera VC are controlled when executing the attack, the position and orientation of the virtual camera VC can be changed at the start of the attack action before the attack hits the enemy character. Thus, the player character 17 can be made to look attractive during the entire attack action from its start.

In the present embodiment, the predetermined position and orientation of the virtual camera VC may be pre-set for each type of attack. In that case, the camera control processing part 31 may control the virtual camera VC such that it is in the position and orientation corresponding to the type of attack for which the instruction input is received. Here, even in the case where any type of attack is instructed to be executed by the player character 17, the virtual camera VC can be controlled to be in the position and orientation corresponding to the attack. Therefore, the player character 17 can be made to look more attractive in the way that matches the type of attack executed at the instant when the player character 17 defeats the strong enemy character 19.

In some games, the game character may be brought into the status that is less vulnerable to damage. For example, the game character takes a defensive posture or invokes a predetermined defensive skill. In the present embodiment, in regard to such cases, when receiving an instruction input from the player to cause the player character 17 to execute an attack on the strong enemy character 19, it may be determined whether or not the strong enemy character 19, which is the attack target, is in a defensive status. Further, in the case where it is determined not to be in the defensive status, it may also be determined whether or not the strong enemy character 19 is able to be brought into the predetermined state by this attack. Here, in the case where the strong enemy character 19 is in the defensive status, the virtual camera VC can be controlled not to move at all. This prevents errors such as the virtual camera VC being accidentally moved even though the strong enemy character 19 is not defeated.

In some games, as in the present embodiment, the player character 17 operated by the player may execute a battle against a number of enemy characters, including the strong enemy character 19 and the weak enemy character 21. In such cases, if the determination is performed on every battle against all enemy characters or if the virtual camera VC is controlled in each battle, the processing load on the information processing device 3 becomes extremely large, and the virtual camera VC must be moved frequently, which may make the game screen hard to see.

In the present embodiment, in regard to such cases, when receiving an instruction input from the player to cause the player character 17 to execute an attack on the strong enemy character, it may be determined whether or not the enemy character, which is the attack target, is of the specific type (in the present embodiment, the strong enemy character 19). Further, in the case where the enemy character is of the specific type, it may also be determined whether or not the enemy character is able to be brought into the predetermined state by this attack. In this case, in the case where the attack target is the strong enemy character 19, such as the boss character, the mid-boss character, or the main enemy character, the player character can be made to look attractive at the instant when it defeats the strong enemy character 19. Meanwhile, in the case where the attack target is the weak enemy characters 21 such as the non-critical character, the virtual camera VC can be controlled not to move at all. Therefore, this arrangement can suppress an increase in the processing load on the information processing device 3 and can also prevent the game screen from becoming hard to see due to the frequent movement of the virtual camera VC.

In the present embodiment, the first determination processing part 29 may include: the hit determination processing part 37 that determines whether or not the attack hits the strong enemy character 19 based on the area of the attack instructed to be executed and the position of the strong enemy character 19; and the damage amount calculation processing part 39 that calculates the amount of damage received by the strong enemy character 19 based on the attacking power of the attack and the defensive power of the strong enemy character 19 in the case when the attack is determined to hit the strong enemy character 19. In that case, the first determination processing part 29 may determine whether or not the strong enemy character 19 is defeatable, based on the amount of damage calculated and the remaining physical strength value of the strong enemy character 19. Here, in the case where the amount of damage received by the strong enemy character 19 is greater than or equal to the remaining physical strength value, it can be determined whether or not the strong enemy character 19 is defeatable, and it can also be determined with high accuracy whether or not the strong enemy character 19 is defeated due to the hit of the attack.

6. Modification Examples

The present invention is not limited to the embodiments described above, and various modifications can be made thereto without departing from the spirit and technical concept of the present invention.

6-1. Case of Executing Series of Attacks Caused by Firing Attack Elements

In the present modification example, the player character 17 can execute a series of attacks on the strong enemy character 19 by firing a plurality of attack elements in succession. The series of attacks is the attacking way. In this case, in the case of receiving an instruction input from the player to cause the player character 17 to execute a series of attacks on the strong enemy character 19, the first determination processing part 29 determines whether or not the last attack element of the series of attacks (so-called finishing blow) can bring the strong enemy character 19 into the predetermined state. In the case where the strong enemy character 19 is able to be brought into the predetermined state by the last attack element, the camera control processing part 31 may control the virtual camera VC to be in the predetermined position and orientation when the player character 17 executes the last attack element.

FIG. 12 shows an example of the control of the position and orientation of the virtual camera VC that is performed by the camera control processing part 31 of the present modification example. When the player inputs an instruction to execute a series of attacks, the player character 17 starts the series of attacks, and every time the execution of the attack element is repeated, the physical strength value of the strong enemy character 19 is reduced by a predetermined amount in accordance with the attack(s) received. During this time, the first determination processing part 29 determines whether or not the last attack element of the series of attacks can defeat the strong enemy character 19. Then, when the strong enemy character 19 is determined to be defeatable by the last attack element, the virtual camera VC is controlled by the camera control processing part 31 to be at the predetermined position and orientation. In an example shown in FIG. 12, as in FIG. 6 described above, for example, because the player character 17 executes an attack with a weapon held in the right hand, the virtual camera VC is moved to the front right side of the player character 17. At this time, as shown in the lower part of FIG. 12, the camera control processing part 31 moves the virtual camera VC continuously, for example, in an arc shape over a predetermined period of time from the position and orientation prior to the movement, whereby the virtual camera VC is controlled to be in the predetermined position and orientation. In the case of the series of attacks, there is a predetermined time interval from when the instruction input for the series of attacks is received until the last attack element is executed, which enables such camera control. Note that the gaze point of the virtual camera VC in this case may be set in the position of the player character 17 or the position of the strong enemy character 19, or in an intermediate position between them.

The processing contents other than those described above are the same as those in the embodiments, and thus a description thereof is omitted.

FIG. 13 shows an example of the processing procedure executed by the information processing device 3 in the present modification example. In FIG. 13, the same step as that in FIG. 11 is denoted by the same reference character, and thus a description thereof is omitted as appropriate.

Step S5 is the same as that in FIG. 11 described above. In next step S10, the information processing device 3 causes the first determination processing part 29 to determine whether or not an instruction input from the player to cause the player character 17 to execute a series of attacks on the enemy character has been received. In the case where the instruction input is not received (step S10: NO), the operation returns to step S5 described above. On the other hand, in the case where instruction input is received (step S10: YES), the operation proceeds to the next step S13.

In step S13, the information processing device 3 causes the battle execution processing part 27 to make the player character 17 start the series of attacks on the strong enemy character 19. Thus, the player character 17 sequentially executes a plurality of attack elements in succession constituting the series of attacks.

Step S15 and step S20 are the same as those in FIG. 11 described above. In step S25, the information processing device 3 causes the first determination processing part 29 to determine whether or not the strong enemy character 19, which is the attack target, is defeatable by the last attack element of the series of attacks. In the case where the strong enemy character 19 is determined not to be defeatable (step S25: NO), the operation proceeds to step S50. On the other hand, in the case where the strong enemy character 19 is determined to be defeatable (step S25: YES), the operation proceeds to the next step S30.

In step S30, the information processing device 3 causes the camera control processing part 31 to control the position and orientation of the virtual camera VC. At this time, as described above, the camera control processing part 31 controls the virtual camera VC by continuously moving it from the position and orientation prior to the movement to the predetermined position and orientation over a predetermined period of time.

Note that the processing from steps S15-S30 is executed after the player character 17 starts the series of attacks in step S13 until the last attack element is started in step S35 to be mentioned later.

In step S35, the information processing device 3 causes the battle execution processing part 27 to make the player character 17 execute the last attack element of the series of attacks, and the series of attacks is completed. Step S50 is the same as that in FIG. 11.

Steps S40-S45 and steps S55-S60 are the same as those in FIG. 11 described above.

According to the modification example described above, the position and orientation of the virtual camera VC are not switched instantaneously to the pre-set position and orientation, but can be continuously moved via a midway route, so that the displayed image taken by the virtual camera VC can be continuously changed in real time. This can prevent the player from missing the positional relationship with the game character that would occur in the case of switching the position and orientation of the virtual camera VC. As a result, after defeating the strong enemy character 19, the player character 17 is allowed to do the next action (movement or the like) smoothly.

According to the present modification example, in the case of the normal attack, whether or not the enemy character is able to be brought into the predetermined state is not determined, and the virtual camera VC is controlled not to move at all. Only in the case of a series of attacks caused by firing a plurality of attack elements in succession, whether or not the enemy character is able to be brought into the predetermined state is determined, or the virtual camera VC is controlled to move at all. This can make the player character 17 look more attractive at the instant when the strong enemy character 19 is defeated by the finish blow in the case where the player character 17 executes a series of attacks, and can also suppress an increase in the processing load on the information processing device 3 without performing the processing in the normal attack.

6-2. Others

The case where one camera pattern (the position and orientation of the virtual camera VC) is set for one type of attack has been described above. However, the present invention is not limited thereto, and a plurality of camera patterns may be set for one type of attack. In this case, from among the plurality of camera patterns, an optimal camera pattern may be selected according to the situation and status at the time when the attack instruction input is received, the type of strong enemy character 19, which is the attack target, and the like. For example, such a camera pattern may be selected randomly from the plurality of camera patterns.

The case in which a single strong enemy character 19 is defeated in an attack executed by the player character 17 has been described above. However, for example, in the case where the area of the attack is wide, it may be possible to defeat multiple strong enemy characters 19 at once. In that case, the movement processing of the virtual camera VC that is the same as that of the embodiment may be performed such that the player character 17 and a strong enemy character 19, which is a processing target, fit in the game screen; the strong enemy character 19 set as the processing target is, for example, one located closer to the gaze point of the virtual camera VC or to the player character 17 among the plurality of strong enemy characters 19 which are determined to be defeatable. In the case of attack covering a wide area, the distance from the gaze point of the virtual camera VC to the enemy or player character may be set such that a part (e.g., 80%) of the effect of the attack is exhibited within the game screen.

For example, in the case where the attack instruction input is received when the player character 17 is located near an object such as a wall or a box, those objects may become obstacles and prevent the virtual camera VC from moving if those objects exist in the destination or movement route of the virtual camera VC. In such the case, for example, by correcting the position of the player character 17, the destination or movement route of the virtual camera VC may be evacuated from the obstacles, allowing for the movement of the virtual camera VC.

For example, in the case of moving the virtual camera VC, stop motion or slow motion may be applied onto the attack action of the player character 17 or the operation of defeating the strong enemy character 19, thereby performing rendition that makes the player character 17 look more attractive at the instant when the player character 17 defeats the strong enemy character 19.

Although the case has been described above in which the player character 17 battles against the strong enemy character 19 which is automatically controlled by the game program, opponents are not limited to non-player characters. For example, in the case where the first player character operated by the first player and the second player character operated by the second player battle against each other in an online game, the processing of the present invention may be applied to each player character. In this case, the processing of the present invention can make both player characters look attractive.

Techniques by the embodiment and each modified example may be appropriately combined and utilized in addition to the examples having already described above. Although exemplification is not performed one by one, the embodiment and each modified example are carried out by various changes being applied thereto without departing from the technical idea of the present invention.

The problems solved by the embodiments and modification examples and the effects thereof are not limited to those described above. The embodiments and modification examples can solve other problems not mentioned above or exhibit other effects not mentioned above, or can solve parts of the described problems or exhibit parts of the described effects.

7. Hardware Configuration of Information Processing Device

An exemplary hardware configuration will be described for the information processing device 3 achieving the processing parts implemented by a program executed by the CPU 301 described above, with reference to FIG. 14.

As shown in FIG. 14, the information processing device 3 has the circuitry including a CPU 301, a ROM 303, a RAM 305, a GPU 306, a dedicated integrated circuit 307 constructed for specific use such as an ASIC or an FPGA, an input device 313, an output device 315, a storage device 317, a drive 319, a connection port 321, and a communication device 323. These constituent elements are mutually connected via a bus 309 and an input/output (I/O) interface 311 such that signals can be transferred.

The game program can be recorded in a ROM 303, the RAM 305, and the storage device 317 such as an hard disk device, for example.

The game program can also temporarily or permanently (non-transitory) be recorded in a removable recording medium 325 such as magnetic disks including flexible disks, various optical disks including CDs, MO disks, and DVDs, and semiconductor memories. The recording medium 325 as described above can be provided as so-called packaged software. In this case, the game program recorded in the recording medium 325 may be read by the drive 319 and recorded in the storage device 317 through the I/O interface 311, the bus 309, etc.

The game program may be recorded in, for example, a download site, another computer, or another recording medium (not shown). In this case, the game program is transferred through a network NW such as a LAN or the Internet and the communication device 323 receives this program. The program received by the communication device 323 may be recorded in the storage device 317 through the I/O interface 311, the bus 309, etc.

The game program may be recorded in appropriate external connection device 327, for example. In this case, the game program may be transferred through the appropriate connection port 321 and recorded in the storage device 317 through the I/O interface 311, the bus 309, etc.

The CPU 301 executes various process in accordance with the program recorded in the storage device 317 to implement the battle execution processing part 27, the first determination processing part 29, the camera control processing part 31, the second determination processing part 33, and the third determination processing part 35, etc. In this case, the CPU 301 may directly read and execute the program from the storage device 317 or may be execute the program once loaded in the RAM 305. In the case that the CPU 301 receives the program through, for example, the communication device 323, the drive 319, or the connection port 321, the CPU 301 may directly execute the received program without recording in the storage device 317.

The CPU 301 may execute various processes based on a signal or information input from the input device 313 such as the game controller 5, a mouse, a keyboard, and a microphone as needed.

The GPU 306 executes processes for displaying images such as a rendering processing based on a command of the CPU 301.

The CPU 301 and the GPU 306 may output a result of execution of the processes described above from the output device 315 such as the display device 7, for example. And the CPU 301 and the GPU 306 may transmit this process result through the communication device 323 or the connection port 321 as needed or may record the process result into the storage device 317 or the recording medium 325.

What is claimed is:

1. A game processing method executed by an information processing device, comprising:

executing a battle between a first game character and a second game character;

determining whether an attack of the first game character hits the second game character based on an area within which the attack is effective and a position of the second game character before the first game character starts motion of the attack in a case of receiving an instruction input to cause the first game character to execute the attack on the second game character, and determining whether the second game character is able to be brought into a predetermined state by hitting the attack in a case where the attack is determined to hit the second game character; and controlling a virtual camera for displaying images of the first game character and the second game character such that the virtual camera is in a predetermined position and a predetermined orientation when the first game character executes the attack in a case where the second game character is determined to be able to be brought into the predetermined state.

2. The game processing method according to claim 1, wherein the predetermined position and the predetermined orientation of the virtual camera is set for each type of the attack, and wherein the controlling the virtual camera comprises controlling the virtual camera such that the virtual camera is in the predetermined position and the predetermined orientation corresponding to the type of the attack for which the instruction input is received.

3. The game processing method according to claim 2, wherein the controlling the virtual camera comprises controlling the virtual camera such that the virtual camera is in the predetermined position and the predetermined orientation, by continuously moving the virtual camera from a position and an orientation prior to movement to the predetermined position and the predetermined orientation over a predetermined period of time.

4. The game processing method according to claim 1, further comprising:

determining whether the second game character, which is an attack target, is in a predetermined status in the case of receiving the instruction input, wherein the determining whether the second game character is able to be brought into the predetermined state comprises determining whether the second game character is able to be brought into the predetermined state by the attack in a case where the second game character is determined to not be in the predetermined status.

5. The game processing method according to claim 1, further comprising:

determining whether the second game character, which is an attack target, is of a predetermined type in the case of receiving the instruction input, wherein the determining whether the second game character is able to be brought into the predetermined state comprises determining whether the second game character is able to be brought into the predetermined state by the attack in a case where the second game character is determined to be of the predetermined type.

6. A game processing method executed by an information processing device, comprising:

executing a battle between a first game character and a second game character;

determining whether the second game character is able to be brought into a predetermined state by an attack in a case of receiving an instruction input to cause the first game character to execute the attack on the second game character; and controlling a virtual camera for displaying images of the first game character and the second game character such that the virtual camera is in a predetermined position and a predetermined orientation when the first game character executes the attack in a case where the second game character is determined to be able to be brought into the predetermined state, wherein the executing the battle comprises executing a battle between the first game character and the second game character, the first game character being capable of executing a series of attacks by performing a plurality of attack elements in succession as the attack, wherein the determining whether the second game character is able to be brought into the predetermined state comprises determining whether the second game character is able to be brought into the predetermined state by a last attack element in a case of receiving an instruction input to cause the first game character to execute the series of attacks on the second game character, and wherein the controlling the virtual camera comprises controlling the virtual camera to be in the predetermined position and the predetermined orientation when the first game character executes the last attack element in a case where the second game character is determined to be able to be brought into the predetermined state.

7. The game processing method according to claim 1, wherein the determining whether the second game character is able to be brought into the predetermined state comprises calculating an amount of damage received by the second game character based on an attacking power of the attack and a defensive power of the second game character in a case where the attack is determined to hit the second game character, and determining whether the second game character is able to be brought into the predetermined state based on the amount of damage and a remaining physical strength value of the second game character.

8. A non-transitory recording medium readable by an information processing device, the recording medium storing a game program programmed to cause the information processing device to:

execute a battle between a first game character and a second game character;

determine whether an attack of the first game character hits the second game character based on an area within which the attack is effective and a position of the second game character before the first game character starts motion of the attack in a case of receiving an instruction input to cause the first game character to execute the attack on the second game character, and determine whether the second game character is able to be brought into a predetermined state by hitting the attack in a case where the attack is determined to hit the second game character; and control a virtual camera for displaying images of the first game character and the second game character such that the virtual camera is in a predetermined position and a predetermined orientation when the first game character executes the attack in a case where the second game character is determined to be able to be brought into the predetermined state.

* * * * *